United States Patent [19]

Newman

[11] 4,383,598
[45] May 17, 1983

[54] CONVEYOR CONTROL APPARATUS

[76] Inventor: Frank E. Newman, 6777 Cartilla, Alta Loma, Calif. 91701

[21] Appl. No.: 335,177

[22] Filed: Dec. 28, 1981

[51] Int. Cl.³ ............................................ B65G 13/075
[52] U.S. Cl. .................................. 193/35 A; 414/43;
414/276
[58] Field of Search ............ 193/35 A; 198/781, 783; 414/43, 276, 530

[56] References Cited

U.S. PATENT DOCUMENTS

| | | | |
|---|---|---|---|
| 1,900,149 | 3/1933 | Anderson | 193/35 A |
| 1,900,150 | 3/1933 | Anderson | 193/35 A |
| 1,924,899 | 8/1933 | Anderson | 193/35 A |
| 2,194,219 | 3/1940 | Eggleston | 193/35 A |

FOREIGN PATENT DOCUMENTS 2226096 12/1973 Fed. Rep. of Germany ... 193/35 A

Primary Examiner—Jeffrey V. Nase
Attorney, Agent, or Firm—John H. Crowe

[57] ABSTRACT

Elongate brake members are located under certain of the rollers of an inclined roller type conveyor and are raised by weighted levers into frictional braking engagement with those certain rollers to brake an item moving down the conveyor and over the rollers. The brake members are pivotally supported intermediate their ends so as to apply an equal braking force to the overlying rollers. The levers are rocked by actuators under control of item sensing members located at loading and unloading stations situated adjacent opposite ends of the conveyor.

11 Claims, 11 Drawing Figures

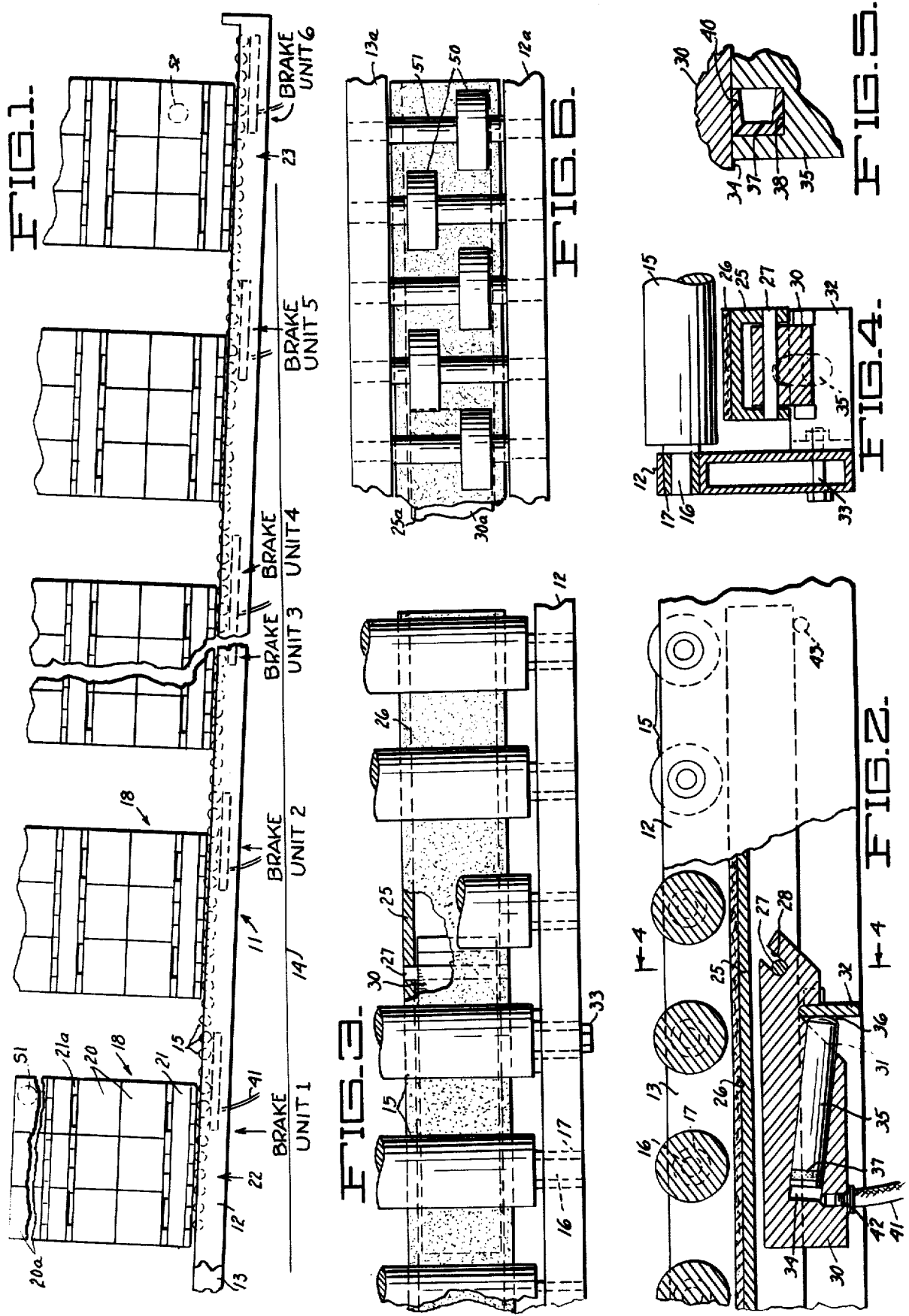

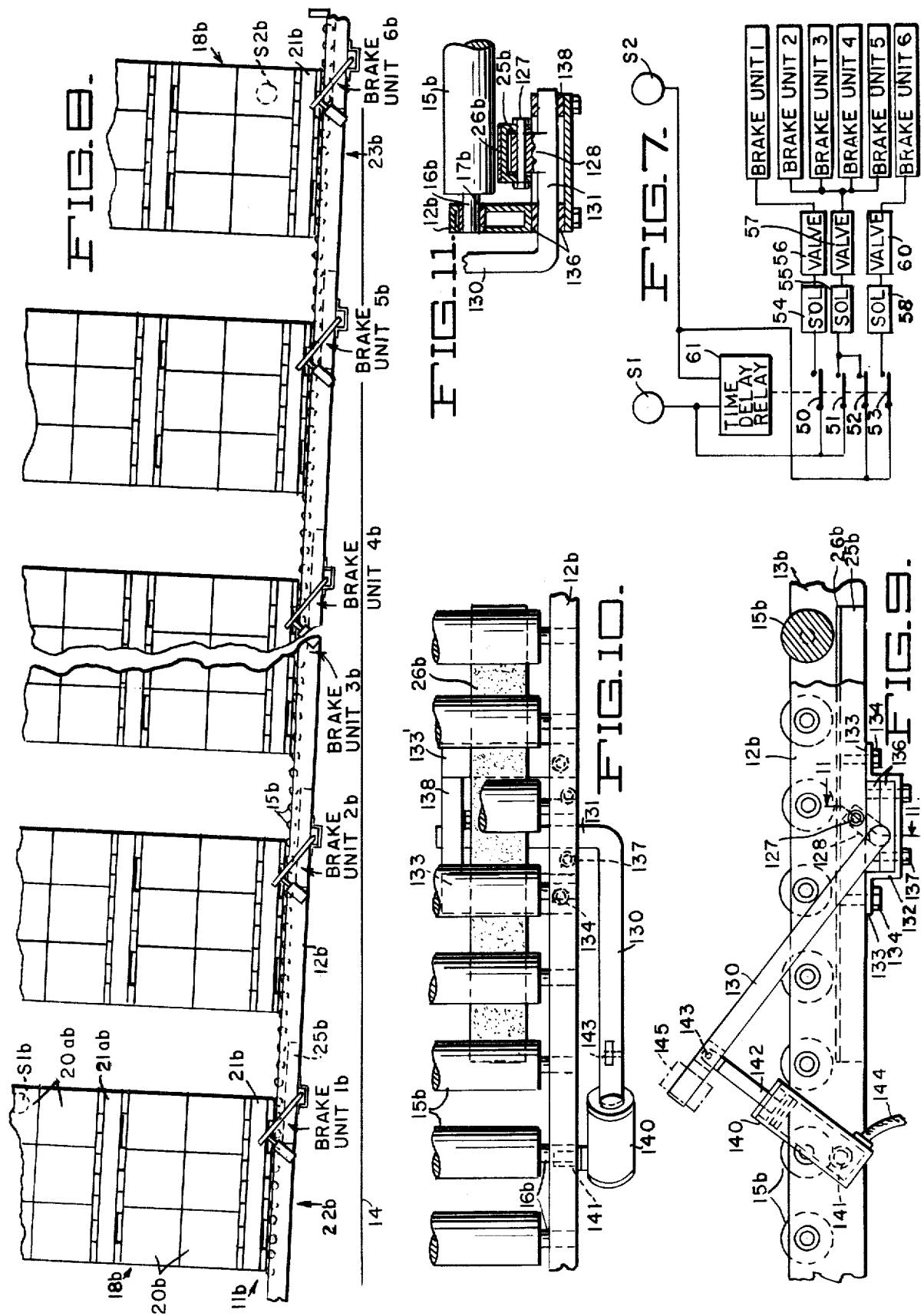

CONVEYOR CONTROL APPARATUS

BACKGROUND OF THE INVENTION

1. Field of the Invention

This invention relates to conveyors for storing and moving items from a loading station to an unloading station and has particular reference to apparatus for controlling movement of such items along a conveyor.

2. Description of the Prior Art

In order to fully utilize warehousing facilities or other storage areas and to facilitate loading and unloading of items stored therein, the items are commonly mounted on rows of inclined roller conveyors which may be spaced alongside each other and also located one above the other to effectively fill the warehouse or other storage facility. The conveyors for this purpose usually comprise a series of rollers rotatably supported between rails which are inclined downwardly from a loading station to an unloading station so that items, when placed on the conveyor at the loading station, will move downwardly by gravity toward the unloading station and will come to rest in a bunched condition, resting one against another.

The items may be either single articles or, in the case of relatively small items, such as bottled or canned goods, they may be packaged in cartons which are mounted on pallets which, in turn, are placed on the conveyor.

In order to reduce the possibility of damage to the items or packages as the result of one striking against another in their descent along the conveyor, braking or other movement control devices have been provided heretofore. Such devices, however, have not been entirely satisfactory. Some are complicated and expensive to manufacture and assemble. Others are not reliable and may malfunction due to wear or other causes, thereby resulting in breaking or damage to the goods.

It is therefore a principal object of the present invention to provide a control apparatus for a conveyor of the above type which is simple and economical to manufacture and assemble.

Another object of the invention is to provide a conveyor control apparatus which is highly reliable and which operates in a fail safe mode.

Another object is to provide a conveyor control apparatus which requires a minimum of energy for operation.

A further object is to provide a conveyor control apparatus which has few operating parts and which may be easily and readily mounted on existing conveyors.

SUMMARY OF THE INVENTION

According to the present invention, a braking system is provided comprising a series of braking units spaced along a roller conveyor, each comprising a friction brake member engageable with the undersides of certain conveyor rollers. Each braking member is carried by a weighted lever which is pivotally supported by one of the conveyor rails and is normally held against gravity by a suitable actuator to maintain the braking member out of frictional engagement with overlying ones of the rollers. When a braking force is to be applied to arrest an item or stack of goods riding over the rollers, the actuator is released enabling the weighted lever to raise the braking member into frictional braking engagement with the overlying rollers. The pivotal support for the lever is so positioned that the frictional engagement of the braking member against the rollers will tend to force the member further against such rollers to effect a gradually increasing and yet secure braking action. Also, the braking member is pivotally supported intermediate its ends by the weighted lever so as to apply an equal braking force against all the engaged rollers.

BRIEF DESCRIPTION OF THE DRAWINGS

The manner in which the above and other objects of the invention are accomplished will be readily understood on reference to the following specification when read in conjunction with the accompanying drawing, wherein:

FIG. 1 is a side view of a conveyor system embodying a preferred form of the present invention.

FIG. 2 is an enlarged side view, partly in cross section, of the conveyor system of FIG. 1 illustrating one of the braking devices of the present invention.

FIG. 3 is a top plan view of a portion of the conveyor system and braking device of FIG. 2.

FIG. 4 is a transverse sectional view taken substantially along the line 4—4 of FIG. 2.

FIG. 5 is an enlarged fragmentary cross sectional view illustrating the sliding piston seal.

FIG. 6 is a top plan view, similar to FIG. 3, but illustrating the invention associated with an alternative form of conveyor.

FIG. 7 is a schematic view illustrating the controls for various braking devices.

FIG. 8 is a side view of a modified form of the invention.

FIG. 9 is an enlarged side view of a section of the conveyor system of FIG. 8, illustrating one of the braking devices.

FIG. 10 is a top plan view of the portion of the conveyor system of FIG. 9.

FIG. 11 is a transverse sectional view taken substantially along line 11—11 of FIG. 9.

DETAILED DESCRIPTION OF THE PREFERRED EMBODIMENT

Although this invention is susceptible to embodiment in many different forms, there is shown in the drawing and will be described in detail certain specific embodiments with the understanding that the present disclosure is to be considered as an exemplification of the principles of the invention and is not intended to limit the invention to the embodiment illustrated. The scope of the invention will be pointed out in the appended claims.

Referring to FIGS. 1 to 4 in particular, a conveyor generally indicated at 11, to which the braking apparatus of the present invention is applied, is shown as comprising a pair of spaced parallel side rails 12 and 13 which are suitably supported in an inclined position over a horizontal supporting surface 14. A series of regularly spaced conveyor rollers 15 are provided having trunnions 16 at their ends which are journalled in bearings 17 in the rails 12 and 13, permitting free rotation of the rollers. Thus, items shown as stacks 18 of container cartons 20 mounted on pallets 21 may be mounted on the conveyor at a loading station 22 to move by gravity along the conveyor to an unloading station 23 where the foremost stack 18 comes to rest. Following stacks 18 move along the conveyor and come to rest against previously arrested ones.

Although each stack 18 may comprise any number of cartons, or, in fact, may comprise only a single article, those stacks chosen for illustration comprise two levels of cartons 20 supported by an underlying pallet 21, the uppermost cartons being surmounted by a second pallet 21a which also supports two levels of cartons 20a.

According to the present invention, spaced brake units 1 through 6 are located along the length of the conveyor. Brake unit 1 is located adjacent the loading station 22 and brake unit 6 is located adjacent the unloading station 23. Although six brake units are shown, any number may be provided depending on the length of the conveyor, the angle of inclination of the conveyor, the weight of the items to be carried, etc.

Each brake unit comprises an elongate brake member 25 which is U-shaped in cross-section as seen in FIG. 4. Such brake member is of a length to underlie a selected number of conveyor rollers 15 and although it is shown as underlying six such rollers, it may be made of any desired length to underlie any desired number of rollers.

A strip 26 of frictional braking material is suitably attached, as by adhesive, to the upper surface of the brake member.

A pivot pin 27 is secured between the sides of the brake member 25, midway between its ends, and is pivotally received in the bottom of an inclined slot 28 formed in a gravity operable lever member 30, forming an actuator. The latter member 30 is pivotally supported for movement about a horizontal axis and, for this purpose, a V-shaped notch 31 is formed across the underside of the lever member 30 to fulcrum on a cross bar 32 which is attached to the side rail 12 by a bolt 33.

The lever member 30 is substantially square in cross section and slidably fits within the sides of the brake member 25. A closed end cylinder bore 34 is formed endwise in the lever member 30 to slidably receive a piston 35. The latter has a semi-spherical head 36 at one end to bear against the side of the cross bar 32. A ring-shaped sliding seal 37 (see also FIG. 5) is mounted in a circumferential groove 38 in the opposite end of the piston and comprises a flexible element of plastic or the like which is U-shaped in cross section and has one leg 40 which slidably bears against the surface of the bore 34.

The lever member 30 is preferably formed of a heavy material, such as iron, whereas the brake member 25 is preferably formed of a relatively lighter material, such as aluminum.

A flexible tube 41 is attached through a suitable fitting 42 to the lever member 30 and communicates with the closed end of the bore 34. When air under pressure is applied through the tube 41, the piston 35 is forced to the right, in FIG. 2, causing the lever member 30 to pivot clockwise about the upper edge of the cross bar 32 to its illustrated position, thus lowering the brake member 25 out of frictional braking engagement with the overlying rollers 15. In this condition, the brake member 25 may rest against pins, one of which is shown at 43, extending between the sides of the member 25 and against the upper end of the cross bar 32 to maintain the brake member parallel with the undersides of the rollers 15 when out of braking engagement with the rollers 15.

When air pressure is released from the tube 41, the lever member 30, by virtue of its weight, will rock counter-clockwise and thus raise the brake member 25 into frictional braking engagement with the overlying rollers 15.

It will be noted, on reference to FIG. 2, that the pivot axis of lever member 30, as formed by the upper edge of the cross bar 32 is located below and to the left of the pivot pin 27. Therefore, in causing a braking operation, the lever member 30 will swing its braking member 25 upwardly and to the left into engagement with the rollers 15. Since the rollers are rotated clockwise by the items carried thereby, the undersides of the rollers will tend to frictionally drive the brake member 25 to the left, thereby causing the latter to exert further braking force against the overlying rollers. The braking device then becomes self-energizing and reduces the overall energy required to operate the braking apparatus, regardless of the weight of the items 20.

Accordingly, it will be seen that if the air supply is accidentally or otherwise released from the cylinder 34, the lever 30 will automatically rock counter-clockwise to cause braking of overlying rollers 15 to thus arrest the item or stack of items moving thereover.

Although various control systems may be provided for controlling the different brake units 1 to 6, I prefer to employ that shown in the schematic diagram of FIG. 7. Two sensing units S1 and S2 (see also FIG. 1) are provided. These may be of any well known commercially available type such as mechanically actuated, photo-electrically actuated, capacitatively actuated, etc. Unit S1 is located at the load station 22 to be triggered by an uppermost carton 20a of the stack 18 at such station. Thus, the sensor S1 will not be triggered until the stack is filled to the proper height. Sensing unit S2 is located at the unloading station 23 to be triggered by the absence of a carton located at the unloading station.

Triggering of either S1 or S2 will energize an intermittently operating time delay relay 61 which will intermittently close a series of relay switches 50 to 53 at a cyclic rate of, for example, five seconds open and five seconds closed. Sensor S1 also completes a circuit through contacts 50 and 51 to solenoids 54 and 55 to actuate suitable air valves 56 and 57, respectively, thereby applying air under pressure to the air cylinders 34 for the brake units 1 to 5. This allows all of the stacks 18, except the stack 18 at the unloading station, to move forward at a controlled rate of speed until they come to rest against each other and against the stack at the unloading station.

Sensor S2, when triggered, also completes a circuit through the contacts 52 and 53 to energize solenoids 55 and 58, thereby actuating air valves 57 and 60 to release the brake units 2 to 6, allowing all stacks 18, with the possible exception of the stack at the loading station, to move forward at a rate of speed determined by the time delay relay 61.

Valves 56, 57 and 60 are preferably of the well known threeway type in which each valve is movable to one condition upon energization of the respective solenoid 54, 55 or 58 to admit air under pressure from a suitable pressure source to the connected cylinder 34 and movable to a second condition upon deenergization of the respective solenoid to release air from such connected cylinder.

It will be noted that the various brake units 1 to 6 may be readily and easily mounted on the rails of either new or existing roller or similar conveyors with a minimum amount of modification.

In operation, with no stacks 18 on the conveyor, all of the brake units 1 to 6 will be engaged to brake the overlying rollers 15. As a first complete stack 18 is mounted on the conveyor at the loading station 22, the sensor S1 will be energized to cause release of all of the brake units 1 to 5, thus allowing the stack to move along the conveyor at a rate of speed controlled by the relay 61 until it moves out of range of sensor S1 at which time the brake units 1 to 5 will again be engaged, arresting the stack over the brake unit 2.

As a second complete stack is mounted on the conveyor at the loading station, the sensor S1 is again energized, causing release of the brake units 1 to 5 to allow both stacks to advance along the conveyor until the latest stack moves out of range of the sensor S1. As additional stacks are loaded on the conveyor at the loading station, the brake units 1 to 5 will again be released and the stacks will advance at controlled rates of speed to accumulate against the foremost stack which has arrived at the unloading station 23, thus filling the conveyor.

Now, when the foremost stack 18 is removed from the unloading station 23, the sensor S2 will be energized, releasing the brake units 2 to 6 and enabling all accumulated stacks to move forwardly until the foremost stack deenergizes the sensor S2 to cause the brake units 2 to 6 again brake the overlying stacks. Thus, as the stacks are removed from the unloading station, the following stacks will advance to accumulate against the last one at such unloading station.

DESCRIPTION OF THE FIRST MODIFIED EMBODIMENT

It will be noted from the foregoing description that the entire brake unit of the present invention may be made of relatively narrow width. This is of particular advantage when embodying the invention in conveyor systems in which the roller supporting rails are closely spaced as indicated in the top plan view of FIG. 6. Here, a "skate wheel" type conveyor is depicted in which relatively narrow rollers 50 are rotatably mounted on short shafts 51 mounted between closely spaced rails 12a and 13a. The rollers 50 are alternately located on opposite sides of each other so that they may overlap each other. In this case, the brake member 25a may be guided between the two rails 12a and 13a and the lever member 30a may, as described above, be guided between the depending sides of the brake member 25a.

DESCRIPTION OF THE SECOND MODIFIED EMBODIMENT

FIGS. 8 to 11 illustrate another modified form of the invention. Here, elements similar to those of FIGS. 1 to 4 will be identified with similar reference numerals having the letter "b" added thereto.

Referring to FIGS. 8 to 11, conveyor rollers 15b are rotatably supported between side rails 12b and 13b to convey stacks 18b from a loading station 22b to an unloading station 23b. Brake units 1b to 6b are spaced along the conveyor to control the stacks as they move along towards the unloading station under the influence of gravity.

Each brake unit comprises an elongate brake member 25b which is U-shaped in cross section, as seen in FIG. 11, and has a strip 26b of frictional braking material attached to the upper surface thereof.

A pivot bolt 127 is secured to the brake member 25b midway between its ends and pivotally connects the member to an arm 128 of a lever 130. The latter extends upwardly and rearwardly and is bent at 90° to form a shaft portion 131 which is integral with the arm 128.

Means are provided to pivotally support the lever 130 from the conveyor rail 12b for movement about a horizontal axis. For this purpose, a bearing device is provided comprising a channel-shaped bearing support 132 having outwardly extending flanges 133 which are secured to the underside of the rail 12b by bolts 134. A pair of split bearing blocks 136, preferably of plastic, are secured to the support 132 at one end of the latter by bolts 137 to rotatably support one end of the shaft portion 131. A bearing block 138, also preferably of plastic, is suitably secured to the support 132 at the opposite end of the latter to rotatably support the opposite end of the shaft portion 131.

A pneumatic cylinder 140 is pivotally supported at 141 by the conveyor rail 12b and its piston 142 is pivotally connected at 143 to the lever 130 adjacent its outer end. When air under pressure is applied through a tube 144, the piston 142 is raised to rock the lever 130 clockwise, thus lowering the brake member 25b out of frictional braking engagement with the overlying rollers 15b, as shown in FIG. 9. In this condition, the brake member 25b rests against the flanges 133 of the support 132 and thus maintains the braking member in its illustrated position parallel with the undersides of the rollers 15b and out of engagement therewith.

When air pressure is released from the cylinder 140, the lever 130, by virtue of its weight, will rock counterclockwise and thus raise the brake member 25b into frictional engagement with the overlying rollers 15b.

It will be noted in FIG. 9 that the axis of the shaft portion 131 of lever 130 is located below and to the left of the axis of the pivot bolt 127. Therefore, in causing a braking operation, the member 26b will swing upwardly and to the left into engagement with the rollers 15b. Since the rollers are rotated clockwise by the items carried thereby, the undersides of the rollers will tend to frictionally drive the brake member 25b to the left thereby causing the latter to exert further braking force against the overlying rollers.

If desired, an additional weight, as indicated by the dot-dash lines 145, may be added to the lever 130 to insure that sufficient force is applied to effectively engage the braking member 25b with the rollers 15b.

Accordingly, it will be seen that if the air supply is accidentally or otherwise released from the cylinder 140, the lever 130 will automatically rock counterclockwise to cause braking of the overlying rollers 15b to thus arrest the item or stack of items moving thereover. Thus, it will be seen that the brake units 1b to 6b can be controlled in a manner similar to the control of brake units 1 to 6 of FIG. 1.

It will be noted that the various brake units 1 to 6 may be readily and easily mounted on the rails of either new or existing roller or similar conveyors.

From the foregoing, it will be observed that numerous variations and modifications may be effected without departing from the true spirit and scope of the novel concept of the invention. It is, of course, intended to cover all such modifications that fall within the scope of the appended claims.

I claim:

1. A braking device for a conveyor including a plurality of spaced roller elements for supporting items for movement along said conveyor, comprising:

an elongate brake member under certain of said roller elements, said brake member having an upper surface extending in a plane for frictional engagement with said roller elements, an actuator, first pivot means on said actuator pivotally supporting said brake member for movement about a first axis located intermediate the ends of said brake member, and second pivot means supporting said actuator for movement about a second axis located below and to one side of said first axis to move said brake member into braking engagement with said certain roller elements whereby said frictional engagement of said certain roller elements with said brake member forces said brake member into further braking engagement with said certain roller elements.

2. A braking device as defined in claim 1 wherein said actuator comprises gravity operated means.

3. A braking device as defined in claim 1 wherein said first axis is located midway between the ends of said brake member.

4. A braking device as defined in claim 1 wherein said actuator comprises a weight effective to move said actuator about said second axis under the influence of gravity.

5. A braking device as defined in claim 1 comprising means for maintaining said upper surface of said brake member parallel with the undersides of said certain roller elements when said brake member is out of braking engagement with said certain roller elements.

6. A braking device as defined in claim 1 wherein said actuator comprises a weight effective to move in one direction about said second axis under the influence of gravity whereby to move said brake member into braking engagement with said certain roller elements, and drive means carried by said actuator for moving said actuator in the opposite direction.

7. A braking device as defined in claim 6 wherein said drive means comprises a fluid-operated piston movable in a bore formed in said actuator.

8. A braking device as defined in claim 6 wherein said conveyor includes a pair of spaced rails rotatably supporting said roller elements therebetween, said second pivot means comprises a pivot member fixedly mounted on one of said rails, and said actuator has a notch therein fitted over said pivot member whereby to pivot about said second axis.

9. A braking device as defined in claim 1 wherein said conveyor includes a pair of spaced rails rotatably supporting said roller elements therebetween, said actuator comprises a gravity operated lever, said lever comprises a shaft portion, and a bearing device supports said shaft portion for pivotal movement, said braking device including means for mounting said bearing device on one of said rails.

10. A braking device as defined in claim 9 including a second bearing device supporting said shaft portion for said pivotal movement.

11. A braking device for a conveyor including a plurality of spaced roller elements for supporting items for movement along said conveyor, which comprises:

a brake member extending under certain of said roller elements, said brake member being movable into frictional braking engagement with said certain roller elements, gravity operated means comprising a lever for moving said brake member into braking engagement with said certain roller elements, means pivotally connecting said brake member to said lever for movement about a first axis located intermediate the ends of said brake member whereby to cause said brake member to apply equal braking engagement to all of said certain roller elements, means for pivotally supporting said lever for movement about a second axis by gravity, said second axis being located below and to one side of a vertical plane passing through said first axis whereby said frictional engagement of said roller elements with said brake member forces said brake member into further braking engagement with said certain roller elements, and means for moving said brake member out of said braking engagement.

* * * * *